C. E. ACKER.

ELECTROLYTIC PROCESS OF PRODUCING COMPOUNDS.

APPLICATION FILED SEPT. 14, 1911.

Reissued Nov. 21, 1911. 13,316.

2 SHEETS—SHEET 1.

Witnesses:

C. L. Belcher

Chas. P. Hidden

Inventor

Charles E. Acker

By his Attorneys

Rasmussen & Stockbridge

C. E. ACKER.

ELECTROLYTIC PROCESS OF PRODUCING COMPOUNDS.

APPLICATION FILED SEPT. 14, 1911.

Reissued Nov. 21, 1911. 13,316.

2 SHEETS—SHEET 2.

WITNESSES:

C. L. Belcher

Chas. P. Stidom

INVENTOR

Charles E. Acker

BY

Rosenbaum & Stockbridge

ATTORNEY

UNITED STATES PATENT OFFICE.

CHARLES E. ACKER, OF OSSINING, NEW YORK, ASSIGNOR TO THE NITROGEN COMPANY, A CORPORATION OF NEW YORK.

ELECTROLYTIC PROCESS OF PRODUCING COMPOUNDS.

13,316. Specification of Reissued Letters Patent. Reissued Nov. 21, 1911.

Original No. 914,100, dated March 2, 1909, Serial No. 360,970. Application for reissue filed September 14, 1911. Serial No. 649,397.

*To all whom it may concern:*

Be it known that I, CHARLES E. ACKER, a citizen of the United States, residing at Ossining, in the county of Westchester and State of New York, have invented certain new and useful Improvements in Electrolytic Processes of Producing Compounds, of which the following is a full and clear specification.

This process relates to the electrolytic production of compounds, such as cyanids and cyanamids, especially those of the alkali and alkaline-earth metals.

The process comprises the steps of electrolyzing a molten compound of a metal, for example sodium chlorid or hydroxid, alloying the separated metal with a cathode metal, for example molten lead, removing the alloy and reacting on the alloyed metal, for example with nitrogen or ammonia and with carbon, and returning the residual metal to the cathode. Incidental steps are the injection of a nitrogenous gas in a direction to cause or assist the circulation of the alloy and residual metal, cooling the alloy before injection of the gas, especially by maintaining opposed adjacent streams of the alloy and residual metal; and successively reacting on the alloyed metal and then, at a higher temperature, on the initial product of reaction, in the presence of the residual metal.

Figure 3:
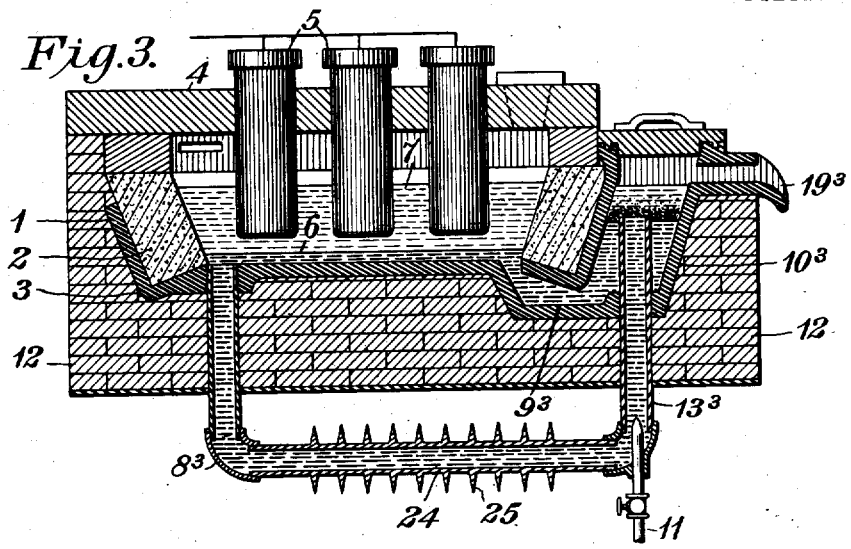
Figure 4:
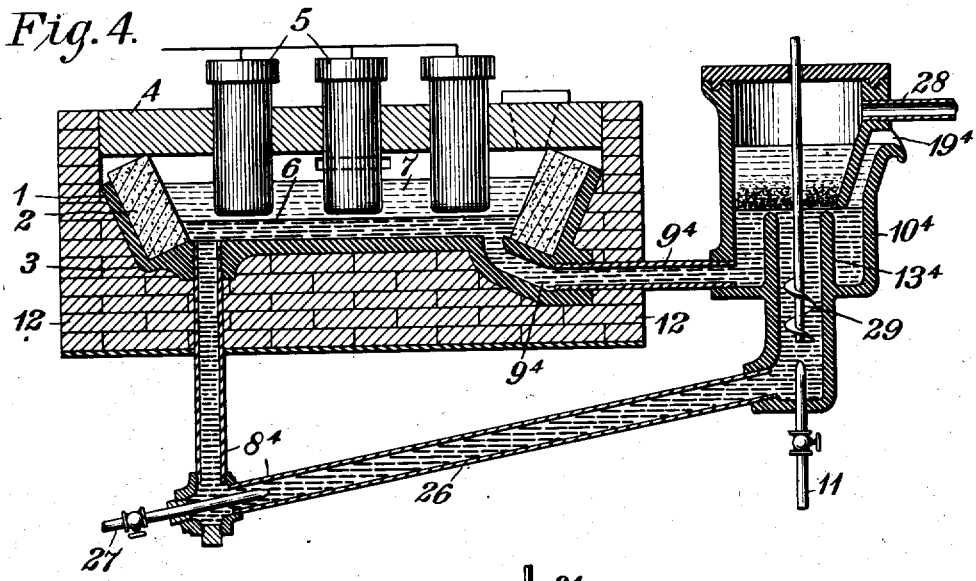
Figure 5:
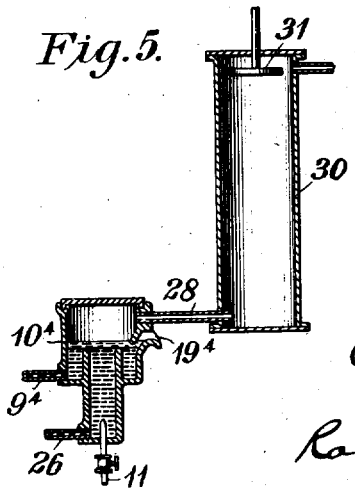

Apparatus which may be used for carrying out the process is shown in the accompanying drawings, in which:

Figures 1, 2, 3, 4, are vertical longitudinal sections of four different constructions, each comprising an electrolytic cell and a separate connected chamber for treating the alloy; and Fig. 5 illustrates an auxiliary gas-absorbing tower.

Each apparatus illustrated has the general construction of that heretofore devised by me for the production of caustic alkali, the electrolytic cell comprising a cast iron vessel 1 having sides 2 provided with cooling passages or an inert lining, a bottom 3 having openings for delivering the alloy and receiving the depleted cathode-metal, and a refractory cover 4 through which pass the depending anodes 5. In the bottom of the vessel is a shallow layer 6 of molten heavy inert metal such as lead, constituting the cathode, upon which is the molten electrolyte 7. The vessel 1 is connected by delivery and return pipes or ducts designated by numerals 8, 9 with suitable indices, to a separate reaction-chamber 10, into which the nitrogenous gas may be introduced by a valved pipe 11. The electrolytic cell is set in brickwork 12; the chamber 10 may also be inclosed in this brickwork, as shown in Figs. 1, 2, 3, or may be outside it, as shown in Fig. 4, depending on the temperature which it is desired to maintain therein.

Figure 1:
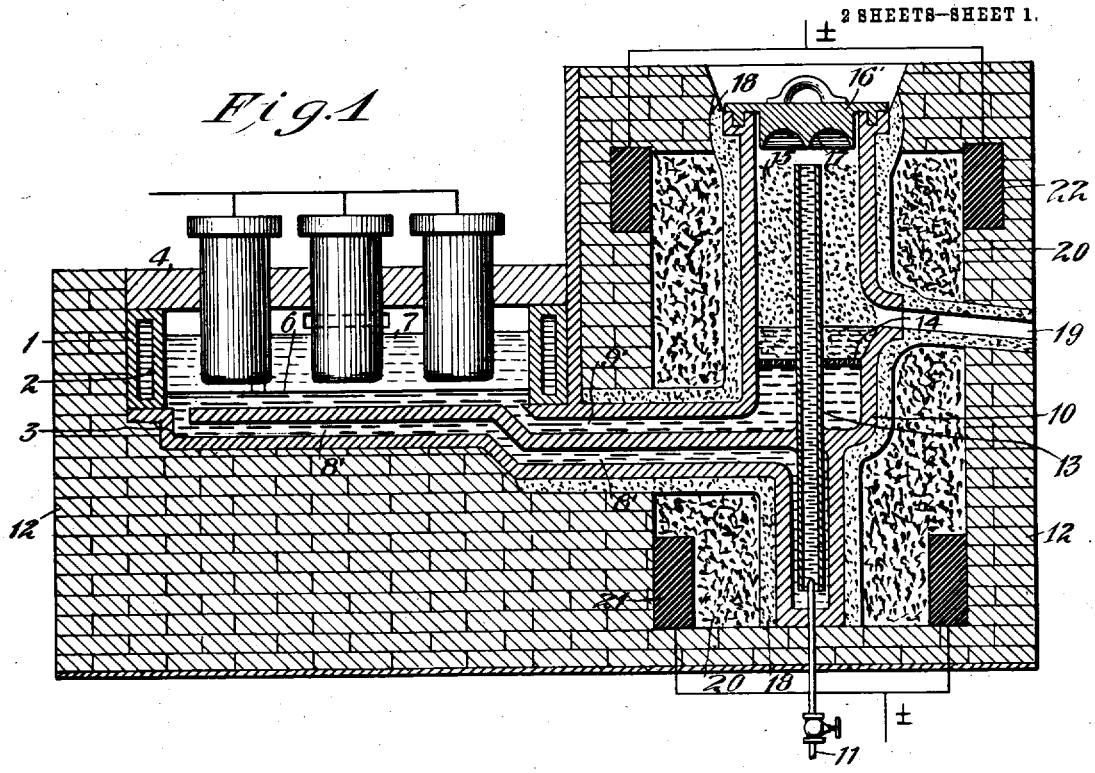

In the apparatus shown in Fig. 1, the delivery and return pipes 8′, 9′, in proximity to each other to permit an exchange of heat between the alloy and residual metal, communicate respectively with the lower and upper compartments of the reaction-chamber. Concentrically arranged in this chamber is a vertical pipe 13′, the lower end of which receives the gas-inlet pipe 11. Surrounding pipe 13′, in the upper compartment of chamber 10, is a perforated disk 14 supporting a body of pulverized charcoal or coke 15. The upper end of chamber 10 is closed by a cover 16′, the lower face of which is concave but has a central conoidal projection 17. Surrounding chamber 10 is a coating of fire-clay 18, a portion of which is extended to provide an outlet 19′, in line with an opening in the side of the chamber. Between the fire-clay coating 18 and the surrounding brickwork 12 is a filling 20 of granular carbon or other resistance material provided at its lower and upper ends with carbon ring-terminals 21, 22, the resister and terminals serving as a means for heating the chamber 10.

Figure 2:
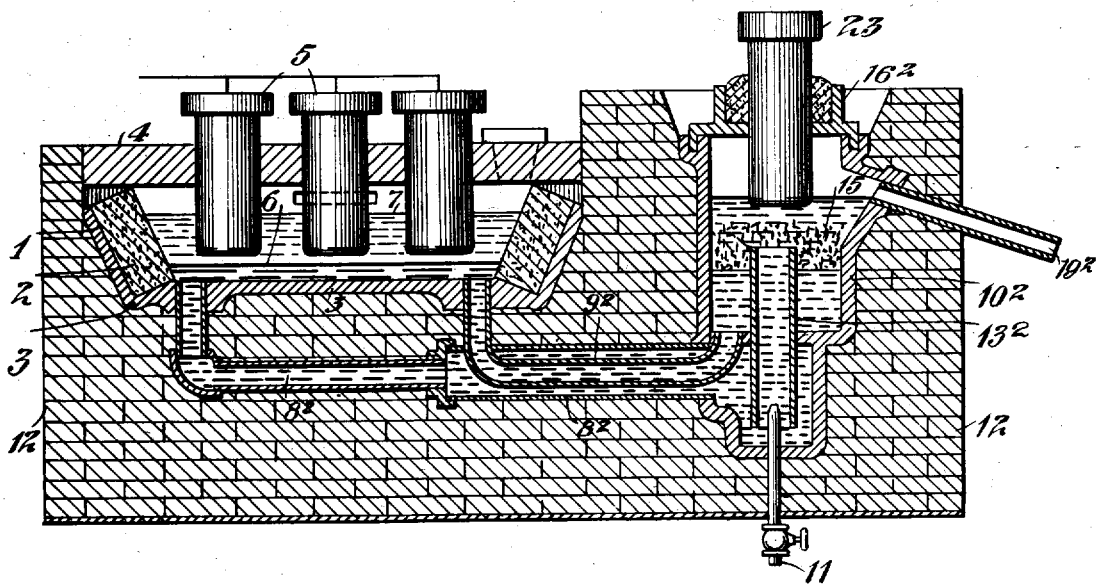

In the apparatus of Fig. 2, the delivery and return pipes $8^2$, $9^2$ are concentrically arranged. The charcoal or other carbonaceous reagent floats on the metal in the reaction-chamber $10^2$ and the contents of this chamber is heated by an alternating electric current passed through the molten products of reaction, acting as a liquid resister, from an electrode 23 depending through the cover $16^2$. The chamber $10^2$ is provided with a central pipe $13^2$ receiving the gas-pipe 11, and with a lateral outlet $19^2$.

In the apparatus of Fig. 3, the delivery pipe $8^3$ has a horizontal portion 24, beneath the brickwork 12, which is provided with a series of annular heat radiating flanges 25, to cool the alloy flowing through it. The reaction-chamber $10^3$ has a central pipe $13^3$ and a lateral outlet $19^3$.

In the apparatus of Fig. 4, both the reaction-chamber $10^4$ and the alloy-delivery pipe $8^4$ are outside the brickwork 12, and this pipe has a lower portion 26 which receives a supplemental gas-inlet pipe 27, and thence inclines upward to the chamber $10^4$. The gas injected through the pipe 27 and the initial light compounds produced by the gas rise and move along the pipe, facilitating the reaction therein. The chamber $10^4$ has a central pipe $13^4$, a trapped outlet $19^4$ for the molten product, and a gas outlet 28.

The circulation of the alloy and residual metal may be effected either solely by the current of injected gas, as in the apparatus of Figs 1, 2, 3, or by a mechanical device, for example the revoluble screw 29 shown in Fig. 4, or by both.

Specific processes which may be carried out are the production of sodium cyanamid or cyanid by the injection of ammonia or nitrogen into the molten sodium-lead alloy resulting from the electrolysis of sodium hydroxid or chlorid upon a lead cathode, in the presence of charcoal or other carbonaceous reagent. When the electrolyte is molten sodium chlorid and ammonia is used as a source of nitrogen, it is important to cool the alloy in transit from the electrolytic cell to the reaction-chamber, and this cooling may be effected either by the transfer of heat to a returning stream of cooler residual metal, or otherwise, as by the heat-radiating devices shown in Fig. 3.

When the electrolyte is molten sodium hydroxid, it is unnecessary to cool the alloy, as its temperature is not sufficiently high to decompose the injected ammonia. Furthermore, instead of employing a simple electrolyte of molten common salt, other salts or compounds may be mixed therewith for the purpose of lowering the melting point or increasing the fluidity. The fluorids and chlorids of the alkali and alkaline-earth metals may be employed for this purpose, and the temperature of the alloy may thus be made so low that it will be practically unnecessary to cool the alloy before injecting the ammonia. The particular reaction which take place in the chamber 10, due to the simultaneous or successive action of nitrogen or ammonia and carbon depends on the temperature in this chamber. If the temperature be low, say about 500 degrees centigrade, the sodium in the alloy is initially converted by ammonia into sodium amid and this amid, in contact with the carbon, is then converted into disodium cyanamid, which is stable and will be discharged as its level rises above the outlet of the chamber. For the continuous production of cyanamids, sodium hydroxid may be employed as an electrolyte and the alloy, at a lower temperature, passing to the reaction-chamber may then be heated by hot residual metal returning from this chamber to the cell. The anodes in this case are preferably of iron, nickel or ferro-nickel, and a lining of solidified sodium hydroxid may be maintained on the side walls of the electrolytic cell, cooled by water circulated through them. For the continuous production of sodium cyanid, molten sodium chlorid may be electrolyzed and the resulting alloy delivered, without cooling, into the reaction-chamber and there treated with nitrogen and carbon, the temperature in this chamber being sufficiently high to maintain the cyanid in the molten condition. The chamber may be heated by an alternating current passed through the supernatant molten cyanid, as illustrated in Fig. 2. Or sodium amid or disodium cyanamid may be produced, as an intermediate product, and then converted into cyanid, in the presence of carbon, by raising the temperature in the reaction-chamber.

In the apparatus shown in Fig. 1, the nitrogenous gas introduced under pressure into pipe 11, forces a stream of the alloy upward against the central projection 17 of the cover 16′, which spreads the alloy and distributes it over the granular charcoal 15, through which it percolates. Residual gases of no value may be allowed to escape through the discharge-outlet 19′. When ammonia is used as a source of nitrogen it is preferable to seal this outlet by the molten product, as shown in Fig. 4, and to deliver the excess ammonia through the pipe 28 into a tower 30, wherein it is absorbed by a spray of water or sulfuric acid, introduced through a rose 31 at the top. The ammonia may then be recovered from the aqueous solution by distillation, or from the ammonium sulfate by heating it with lime, and returned to the reaction-chamber.

I claim:

1. The herein-described process, which consists in continuously electrolyzing a molten compound of a metal, alloying the separated metal with a cathode metal, removing the alloy and reacting on the metal so alloyed with the cathode metal with production of an intermediate compound, supplying a separate reagent and reacting therewith on the intermediate compound, with production of the desired compound, and returning the residual metal to the cathode.

2. The herein-described process, which consists in continuously electrolyzing a molten compound of a metal, alloying the separated metal with a cathode metal, removing the alloy and reacting on the metal so alloyed with the cathode metal, with production of an intermediate compound, reacting on the intermediate compound, at a higher temperature, with production of the desired compound, and returning the residual metal to the cathode.

3. The herein-described process, which consists in continuously electrolyzing a molten compound of a metal, alloying the separated metal with a cathode metal, removing and cooling the alloy and reacting on the metal so alloyed with the cathode metal with production of an intermediate compound, reacting on the intermediate compound, at a higher temperature, with production of the desired compound, and returning the residual metal to the cathode.

4. The process of producing cyanogen compounds, which consists in continuously electrolyzing a molten compound of a metal, alloying the separated metal with a cathode metal, removing the alloy and reacting on the metal so alloyed with the cathode metal with nitrogenous and carbonaceous reagents, and returning the residual metal to the cathode.

5. The process of producing cyanogen compounds, which consists in continuously electrolyzing a molten compound of a metal, alloying the separated metal with a cathode metal, removing the alloy and reacting on the metal so alloyed with the cathode metal, at a higher temperature, with nitrogenous and carbonaceous reagents, and returning the residual metal to the cathode.

6. The process of producing cyanogen compounds, which consists in continuously electrolyzing a molten compound of a metal, alloying the separated metal with a cathode metal, removing and cooling the alloy, reacting on the metal so alloyed with the cathode metal with the ammonia, and on the resulting nitrogen compound, at a higher temperature, with a carbonaceous reagent, and returning the residual metal to the cathode.

7. The process of producing alkali-metal cyanogen compounds, which consists in continuously electrolyzing a molten compound of the alkali metal, alloying the separated alkali metal with a cathode metal, removing the alloy and reacting on the alloyed alkali metal with a nitrogenous gas and a carbonaceous reagent, and returning the residual metal to the cathode.

8. The process of producing alkali-metal cyanogen compounds, which consists in continuously electrolyzing a molten compound of the alkali metal, alloying the separated alkali metal with a cathode metal, removing the alloy and reacting on the alkali metal, at a higher temperature, with nitrogenous gas and a carbonaceous reagent, and returning the residual metal to the cathode.

9. The process of producing alkali-metal cyanids, which consists in continuously electrolyzing a molten compound of the alkali metal, alloying the separated alkali metal with a cathode metal, removing and cooling the alloy, reacting on the alloyed alkali metal with ammonia and on the resulting amid, at a higher temperature, with a carbonaceous reagent, and returning the residual metal to the cathode.

10. The herein described process, which consists in electrolyzing a molten compound of a metal, alloying the separated metal with a cathode metal, removing the alloy and reacting on the metal so alloyed with the cathode metal with production of an intermediate compound, supplying a separate reagent and reacting therewith on the intermediate compound, with production of the desired compound, and returning the residual metal to the cathode.

11. The herein described process, which consists in electrolyzing a molten compound of a metal, alloying the separated metal with a cathode metal, removing the alloy and reacting on the metal so alloyed with the cathode metal with production of an intermediate compound, reacting on the intermediate compound, at a higher temperature, with production of the desired compound, and returning the residual metal to the cathode.

12. The herein described process, which consists in electrolyzing a molten compound of a metal, alloying the separated metal with a cathode metal, removing and cooling the alloy and reacting on the metal so alloyed with the cathode metal with production of an intermediate compound, reacting on the intermediate compound, at a higher temperature, with production of the desired compound, and returning the residual metal to the cathode.

13. The process of producing cyanogen compounds, which consists in electrolyzing a molten compound of a metal, alloying the separated metal with a cathode metal, removing the alloy and reacting on the metal so alloyed with the cathode metal with nitrogenous and carbonaceous reagents, and returning the residual metal to the cathode.

14. The process of producing cyanogen compounds, which consists in electrolyzing a molten compound of a metal, alloying the separated metal with a cathode metal, removing the alloy and reacting on the metal so alloyed with the cathode metal, at a higher temperature, with nitrogenous and carbonaceous reagents, and returning the residual metal to the cathode.

15. The process of producing cyanogen compounds, which consists in electrolyzing a molten compound of a metal, alloying the separated metal with a cathode metal, removing and cooling the alloy, reacting on the metal so alloyed with the cathode metal with ammonia and on the resulting nitrogen compound, at a higher temperature, with a carbonaceous reagent, and returning the residual metal to the cathode.

16. The process of producing alkali-metal cyanogen compounds, which consists in electrolyzing a molten compound of the alkali metal, alloying the separated alkali metal with a cathode metal, removing the alloy and reacting on the alloyed alkali metal with a nitrogenous gas and a carbonaceous reagent, and returning the residual metal to the cathode.

17. The herein described process, which consists in electrolyzing a molten compound of a metal with which other compounds have been mixed for the purpose of increasing the fluidity, alloying the separated metal with a cathode metal, removing the alloy and reacting on the metal so alloyed with the cathode metal with production of an intermediate compound, supplying a separate reagent and reacting therewith on the intermediate compound, with production of the desired compound, and returning the residual metal to the cathode.

18. The process of producing cyanogen compounds, which consists in electrolyzing a molten compound of a metal with which other compounds have been mixed for the purpose of increasing the fluidity, alloying the separated metal with a cathode metal, removing the alloy and reacting on the metal so alloyed with the cathode metal with nitrogenous and carbonaceous reagents, and returning the residual metal to the cathode.

19. The process of producing alkali-metal cyanogen compounds, which consists in electrolyzing a molten compound of the alkali metal with which other compounds have been mixed for the purpose of increasing the fluidity, alloying the separated alkali metal with a cathode metal, removing the alloy and reacting on the alloyed alkali metal with a nitrogenous gas and a carbonaceous reagent, and returning the residual metal to the cathode.

20. The process of producing alkali-metal cyanogen compounds, which comprises electrolyzing a molten compound of the alkali metal, alloying the separated alkali metal with a cathode metal, removing the alloyed cathode metal and alkali metal, converting the alkali metal to an alkali metal cyanogen compound by treatment with nitrogenous and carbonaceous matter, and returning the residual metal to the cathode.

21. The process of producing nitrogen-carbon compounds, which comprises electrolyzing a molten compound of a metal, alloying the separated metal with a cathode metal, removing the alloyed first mentioned metal and cathode metal, converting the said first mentioned metal to a nitrogen-carbon compound by treatment with nitrogenous and carbonaceous matter, and returning the residual metal to the cathode.

22. The process of producing nitrogen-carbon compounds, which comprises electrolyzing a molten compound of a metal, alloying the separated metal with a cathode metal, removing the alloyed first mentioned metal and cathode metal, converting said first mentioned metal to a nitrogen-carbon compound by treatment with nitrogenous and carbonaceous matter.

23. The process of producing alkali-metal cyanogen compounds which comprise forming a mass of molten matter, one constituent of which is the alkali-metal of an alkali-metal compound to be formed, by electrolyzing a molten salt of said alkali metal and depositing the said alkali metal electrolytically into a body of molten cathode material, and then treating the said mass of molten matter to separate at least a part of the so incorporated alkali metal therefrom and to convert said part into a cyanogen compound, said treatment including reacting upon said alkali metal with nitrogenous and carbonaceous matter.

24. The process of producing cyanogen compounds which comprises forming a mass of molten matter, one constituent of which is a metal and another constituent of which is cathode material, by electrolyzing a molten salt of the said metal and depositing the said metal electrolytically into a molten body of said cathode material, and then treating the said mass of molten matter to separate at least a part of the so incorporated metal therefrom and to convert said metal into a cyanogen compound, said treatment including reacting upon said metal with nitrogenous and carbonaceous matter.

25. The process of producing a nitrogen-carbon compound which comprises electrolytically liberating a metallic element, capable of forming nitrogen compounds, in a chamber containing molten cathode metal to form an alloy comprising said element and said cathode metal, conveying said liberated element, while alloyed with said cathode metal, to a second chamber, and effecting a reaction in which the said metallic element, carbon and nitrogen participate.

26. The process of producing a nitrogen-carbon compound which comprises electrolytically liberating a metallic element, capable of forming nitrogen compounds, in a chamber containing molten cathode metal, conveying said liberated element, while alloyed with said cathode metal, to a second chamber, effecting a reaction in which the said metallic element, carbon and nitrogen participate, and returning the impoverished alloy to said first mentioned chamber.

In witness whereof, I subscribe my signature, in the presence of two witnesses.

CHARLES E. ACKER.

Witnesses:

CHAS. P. HIDDEN,

WM. M. STOCKBRIDGE.